US008838354B2

(12) United States Patent
Hartmann et al.

(10) Patent No.: US 8,838,354 B2
(45) Date of Patent: Sep. 16, 2014

(54) COMBINED BRAKING SYSTEM, PARTICULARLY FOR MOTOR VEHICLES

(75) Inventors: Ralf Hartmann, Kriftel (DE); Andreas Heise, Erzhausen (DE); Burkhard Warmbier-Leidig, Alsbach-Hahnlein (DE)

(73) Assignee: Continental Teves AG & Co. oHG (DE)

( * ) Notice: Subject to any disclaimer, the term of this patent is extended or adjusted under 35 U.S.C. 154(b) by 784 days.

(21) Appl. No.: 12/663,920

(22) PCT Filed: Jun. 18, 2008

(86) PCT No.: PCT/EP2008/057667
§ 371 (c)(1),
(2), (4) Date: Jun. 3, 2010

(87) PCT Pub. No.: WO2008/155341
PCT Pub. Date: Dec. 24, 2008

(65) Prior Publication Data
US 2010/0241330 A1 Sep. 23, 2010

(30) Foreign Application Priority Data

Jun. 19, 2007 (DE) .......................... 10 2007 028 566
May 19, 2008 (DE) .......................... 10 2008 024 180

(51) Int. Cl.
B60T 7/02 (2006.01)
G06F 19/00 (2011.01)
B60T 13/74 (2006.01)

(52) U.S. Cl.
USPC ................................................ 701/70; 303/2

(58) Field of Classification Search
None
See application file for complete search history.

(56) References Cited

U.S. PATENT DOCUMENTS

| 6,029,108 A | 2/2000 | Belschner |
| 6,299,261 B1 | 10/2001 | Weiberle et al. |
| 6,317,675 B1 * | 11/2001 | Stolzl et al. ...................... 701/76 |
| 6,345,225 B1 * | 2/2002 | Bohm et al. ..................... 701/70 |
| 6,709,069 B2 * | 3/2004 | Riddiford et al. ............... 303/20 |
| 2004/0060025 A1 * | 3/2004 | Kirschbaum ..................... 716/8 |
| 2008/0021623 A1 | 1/2008 | Frey et al. |

FOREIGN PATENT DOCUMENTS

| DE | 19829126 A1 | 5/1999 |
| DE | 19832167 A1 | 5/1999 |
| DE | 19826131 | 12/1999 |
| DE | 102004009469 A1 | 9/2005 |
| EP | 0924125 A2 | 6/1999 |
| WO | WO 99/26821 | 6/1999 |
| WO | WO2007/014952 A1 | 2/2007 |
| WO | WO 2007014952 A1 * | 2/2007 |

* cited by examiner

Primary Examiner — Fadey Jabr
Assistant Examiner — Krishnan Ramesh
(74) Attorney, Agent, or Firm — RatnerPrestia (57) ABSTRACT

A combined braking system, comprising hydraulic brakes associated with a vehicle axle and brakes actuatable by electromechanical actuators associated with a different vehicle axis, each electronic control unit associated with the electromechanical actuators having at least two high-speed busses, of which one is connected directly to a further electronic control unit and the other is directly or indirectly connected to an electronic or electrohydraulic control unit associated with the hydraulic brakes.

20 Claims, 6 Drawing Sheets

COMBINED BRAKING SYSTEM, PARTICULARLY FOR MOTOR VEHICLES

CROSS REFERENCE TO RELATED APPLICATIONS

This application is the U.S. national phase application of PCT International Application No. PCT/EP2008/057667, filed Jun. 18, 2008, which claims priority to German Patent Application No. 10 2007 028 566.5, filed Jun. 19, 2007 and German Patent Application No. 10 2008 024 180.6, filed May 19, 2008, the contents of such applications being incorporated by reference herein.

BACKGROUND OF THE INVENTION

1. Field of the Invention

The invention relates to a combined braking system, particularly for motor vehicles, having wheel brakes which are assigned to a first vehicle axle and can be activated electromechanically or hydraulically, and having wheel brakes which are assigned to a second vehicle axle and can be activated by means of electromechanical actuators, wherein the wheel brakes which are assigned to the second vehicle axle and can be activated electromechanically can be activated in accordance with a braking request which is applied to the wheel brakes assigned to the first vehicle axle, or data derived therefrom via a vehicle bus (e.g. CAN), and/or in accordance with output signals of a pedal travel sensor which is of redundant design and which determines the activation travel of a brake pedal, and wherein some or all of the wheel brakes which can be activated electromechanically comprise a parking brake device which can be actuated by means of an operator control element, having a, for example, electrohydraulic open-loop and closed-loop control unit which is assigned to the first vehicle axle, having in each case an electronic open-loop and closed-loop control unit which is assigned to the electromechanical actuators of the second vehicle axle, having wheel speed sensors whose signals are fed to the electrohydraulic open-loop and closed-loop control unit and/or also the electronic open-loop and closed-loop control units, and having a communication bus between the electrohydraulic open-loop and closed-loop control unit and the electronic open-loop and closed-loop control units.

2. Description of the Related Art

Such a combined braking system is known from international patent application WO 002007014952 A1. It is to be considered a disadvantage of the previously known braking system that when a communication bus which leads from the electrohydraulic open-loop and closed-loop control unit to an electronic open-loop and closed-loop control unit which is assigned to an electromechanical actuator is defective or faulty, the system goes into a fallback level with restricted functionality or even fails completely.

SUMMARY OF THE INVENTION

An object of the present invention is therefore to increase the availability of the braking functionality in the case of electrical faults in a combined braking system of the generic type mentioned at the beginning. Furthermore, the robustness is to be increased by using standard bus systems such as, for example, CAN. Furthermore, the use of special lines and control lines or buses as well as special parking brake operator control elements is to be avoided. A further object of the invention is to reduce the number of supply lines and control lines on the electromechanical actuator and to ensure a full diagnostic capability at an electromechanical actuator, even in the case of a bus fault.

The objects enumerated above are achieved according to aspects of the invention by virtue of the fact that each electronic open-loop and closed-loop control unit which is assigned to the electromechanical actuators has at least two high speed buses, one of which is connected directly to a further electronic open-loop and closed-loop control unit, and the other of which is connected indirectly or directly to the electrohydraulic open-loop and closed-loop control unit.

In one advantageous development of the subject matter of the invention, the pedal travel sensor is connected indirectly or directly, on two separate paths, to the electronic open-loop and closed-loop control units which are assigned to the electromechanical actuators. The separate paths are preferably formed here by means of buses or of signal lines. The pedal position information which is distributed among the individual open-loop and closed-loop control units, which information does not have to be present redundantly as individual information items, can be processed by communication between the open-loop and closed-loop control units about the respectively present information to form redundant (reliable) information which is then used in turn in order to autonomous action of the control devices, for example moving the brake linings or applying the brake linings, or even the execution of braking operations.

A further increase in the operational reliability of the braking system according to aspects of the invention is achieved in another embodiment variant of the invention by virtue of the fact that at least one of the high speed buses is embodied as a point-to-point connection, even though the bus system is usually configured for use with a large number of partners.

In one particularly preferred embodiment of the subject matter of the invention there is provision that the operator control element for activating the parking brake is connected directly to an electronic open-loop and closed-loop control unit. The electronic open-loop and closed-loop control unit is here the electrohydraulic open-loop and closed-loop control unit or a further open-loop and closed-loop control unit, for example an engine open-loop and closed-loop control unit or a chassis controller. The connection to the electrohydraulic open-loop and closed-loop control unit permits directly, without routing the signals via other partners etc., dynamic braking directly at all the wheels, even applied via the wheels which are, for example, operated hydraulically. A parking brake switch which is connected via a further control device permits the parking brake still to be operated even in the event of a complete failure of the open-loop and closed-loop control unit (for example the electrohydraulic open-loop and closed-loop control unit).

A further advantageous refinement of the subject matter of the invention is that, if there is a fault in a high speed bus, all the system-relevant data (for example braking request) is fed automatically via another high speed bus indirectly or directly to the electronic open-loop and closed-loop control unit connected thereto. This important part of the embodiment makes it possible to continue to ensure the full functionality of the system (braking, parking . . . ) even in the event of a "large-scale fault" such as the failure of a high speed bus, and to prevent any restrictions in the performance. A display, for example by means of a warning lamp or an indication for the need for a workshop service, appear appropriate, however.

In another advantageous embodiment of the subject matter of the invention there is provision that in the event of a failure of an open-loop and closed-loop control unit which is assigned to an electromechanical actuator or its electrical terminal with a fault in individual signal and/or supply lines, or a plurality thereof, connected thereto, the rest of the system is still fully available and can be used for a parking brake function and service brake function. If a wheel unit or the supply thereto fails, the rest of the system can still continue to operate completely autonomously, i.e. dynamic braking can still be carried out in a controlled fashion by means of two to three vehicle wheels. The parking brake can continue to be applied and released again as desired with a wheel actuator. Restriction by means of the parking brake using just one wheel is provided, of course, in the holding force on a slope.

A particularly reliably functioning embodiment variant provides that the electrical supply to one electromechanical actuator, or a plurality thereof, is provided individually or jointly by the actuation of one or more electrical switches by means of a logic OR operation performed on a signal supplied by the electrohydraulic open-loop and closed-loop control unit and on an ignition signal or on a signal supplied by a further electronic open-loop and closed-loop control unit.

A further increase in the operational reliability of the braking system according to aspects of the invention is achieved in one refinement of the subject matter of the invention by virtue of the fact that all the high speed buses are used continuously for data transfer in the normal operating mode and are therefore monitored.

In one particularly preferred embodiment of the invention there is provision that in the event of a failure of the electrohydraulic open-loop and closed-loop control unit at which detection of the braking request by the electrohydraulic open-loop and closed-loop control unit and/or its transmission to the electronic open-loop and closed-loop control units take place the pedal travel sensor information is used for the activation of the electromechanical actuators. If the electrohydraulic open-loop and closed-loop control unit has failed, the hydraulically operated wheels are still used hydraulically, that is to say usually without electronic control.

The electromechanical braked wheels then no longer receive all of the information and can still carry out a braking function in a fallback level. The braking function can take place at the electromechanical actuators because of the pedal sensor and, if appropriate, additional wheel speed information fed twice.

Another advantageous embodiment variant provides that the electronic open-loop and closed-loop control units which are assigned to the electromechanical actuators communicate the braking request to one another and/or the plausibility thereof. Adjustment and plausibility checking as well as possibility of increasing the braking force etc. uniformly.

Finally, in one particularly reliably operating braking system according to aspects of the invention, the electronic open-loop and closed-loop control units which are assigned to the electromechanical actuators are each configured to be failsafe and as a result carry out the braking request and/or the parking braking request if there is a reliable individual command or redundant command. The fail safety, i.e. intrinsic fault detection and redundant intrinsic deactivation paths for safety-critical functions, permits functions, for example braking or release of the brakes, to be performed without intervention, for example hardwire enable line, by a second or third open-loop and closed-loop control unit.

In another advantageous embodiment variant of the invention, a plurality of commands are transmitted redundantly to at least one electronic open-loop and closed-loop control unit, for example an electrohydraulic open-loop and closed-loop control unit, on at least two high speed buses (e.g. CAN), and the data are fed indirectly or directly on the different paths, that is to say redundantly, to the electronic open-loop and closed-loop control unit or units of the electromechanical actuators.

A further increase in the operational reliability of the braking system according to aspects of the invention is achieved according to one refinement of the subject matter of the invention by virtue of the fact that if the data of one data path fail, at least one electronic open-loop and closed-loop control unit of an electromechanical actuator uses the data of the other data path.

The data transmission on the high speed buses can be considered to be reliable by virtue of suitable monitoring mechanisms.

In a particularly preferred embodiment of the invention there is provision that data which reach an electronic open-loop and closed-loop control unit of an electromechanical actuator, but are not intended for this actuator, are passed on, for example, to the actual receiver, on the other high speed bus of the electromechanical actuator.

BRIEF DESCRIPTION OF THE DRAWINGS

The invention will be explained in more detail below in conjunction with six exemplary embodiments and with reference to the appended drawing, in which.

DETAILED DESCRIPTION OF THE PREFERRED EMBODIMENTS

Figure 1:
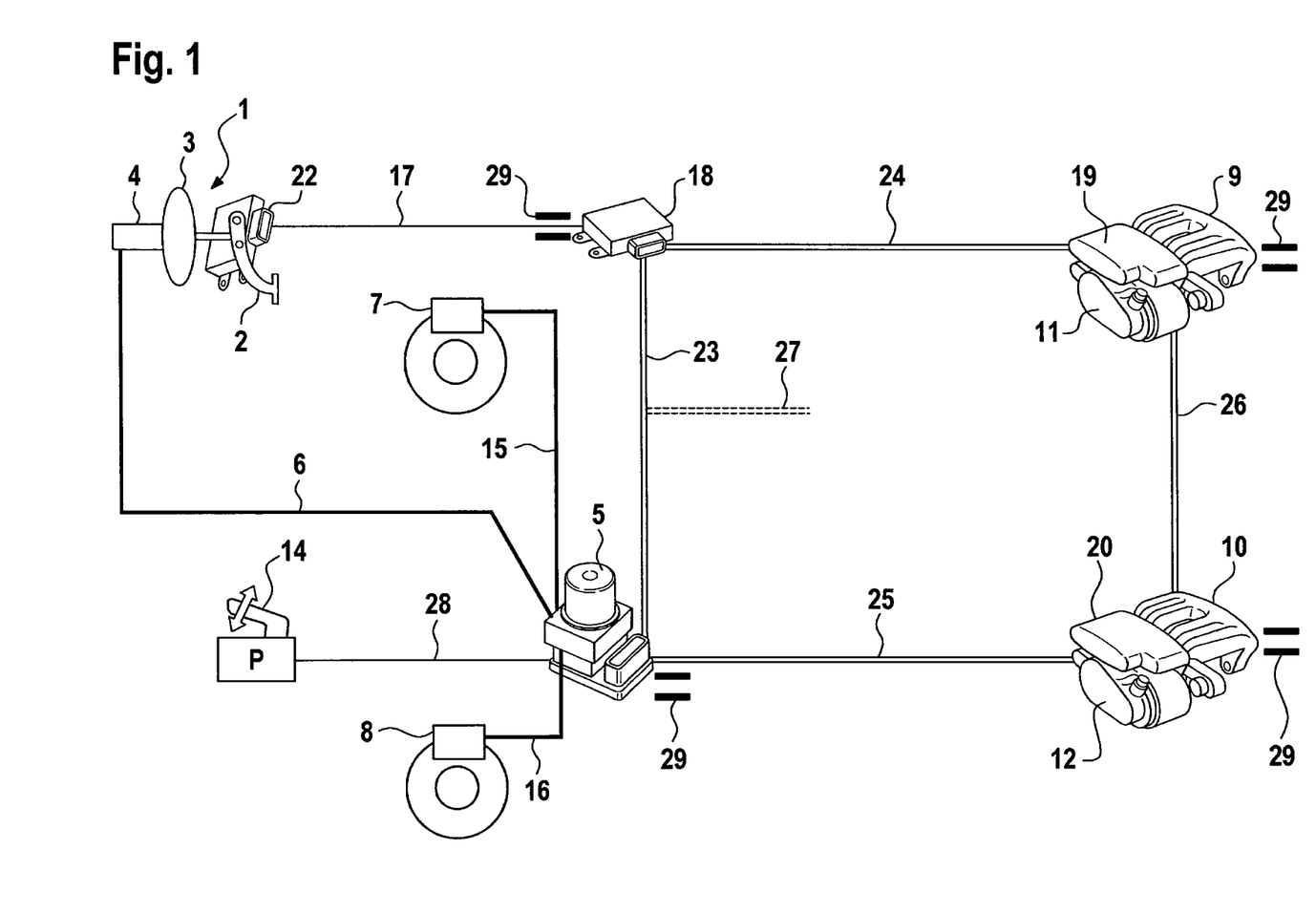
FIG. 1 shows a circuit diagram of a first embodiment of the braking system according to aspects of the invention having brakes which can be activated hydraulically and electromechanically.

The first embodiment of the motor vehicle braking system according to aspects of the invention which is shown in FIG. 1 has essentially an activation unit 1 which can be activated by means of a brake pedal 2. The activation unit 1 itself is composed of a pneumatic brake booster or a partial vacuum brake booster 3 and a master brake cylinder 4 which is connected downstream of the partial vacuum brake booster 3 and to which an electrohydraulic open-loop and closed-loop control unit 5 is connected by means of a hydraulic line 6. Wheel brakes 7, 8, which can be activated hydraulically by means of hydraulic lines 15, 16 and are assigned to a first vehicle axle or front axle in the example shown, are connected to the electrohydraulic open-loop and closed-loop control unit 5.

As is also apparent from FIG. 1, wheel brakes 9, 10, the activation of which is carried out by electromechanical actuators 11, 12 in accordance with the hydraulic pressure applied in the wheel brakes 7, 8 which can be activated hydraulically, are assigned to a second vehicle axle or the rear axle. The abovementioned hydraulic pressure is determined using pressure sensors (not shown) which are integrated into the electrohydraulic open-loop and closed-loop control unit 5. The wheel brakes 9, 10 which can be activated electromechanically are actuated on the basis of this pressure value, i.e. a brake application force of the wheel brakes 9, 10 is set taking into account a braking force distribution function between the front axle and rear axle. Furthermore, the brakes 9, 10 which can be activated electromechanically are actuated in accordance with the activation travel of the brake pedal 2, i.e. in accordance with the driver's deceleration request. For this purpose, the activation travel of the brake pedal 2 is determined using a pedal travel sensor 22 which is preferably of redundant design. The actuation of the wheel brakes 9, 10 which are assigned to the rear axle is carried out in a decentralized fashion by means of, in each case, one electronic open-loop and closed-loop control unit 19, 20.

As is indicated only schematically in FIG. 1, the illustrated braking system is equipped with a parking brake functionality. For this purpose, the wheel brakes 9, 10 which can be activated electromechanically have parking brake devices (not shown) with which the wheel brakes 9, 10 can be locked in the applied state. The parking brake devices can be actuated using an operator control element 14 which is embodied as a pushbutton key and which has three switched positions for the commands "apply", "neutral" and "release".

The present invention provides for the output signals of the pedal travel sensor 22 to be fed via a signal line 17 to a further electronic open-loop and closed-loop control unit 18 which can be formed, for example, by a chassis controller. A first high speed bus 23 forms a direct connection between the electrohydraulic open-loop and closed-loop control unit (HECU) 5 mentioned above and the further electronic open-loop and closed-loop control unit 18, which is connected directly to the electronic open-loop and closed-loop control unit 19 of the electromechanical actuator 11 by means of a further high speed bus 24. A second signal line 28 serves to transmit signals between the parking brake operator control element 14 and the electrohydraulic open-loop and closed-loop control unit (HECU) 5, which is connected directly to the electronic open-loop and closed-loop control unit 20 of the electromechanic actuator 12 by means of a third high speed bus 25, with the result that the output signals of the parking brake operator control element 14 are fed to the abovementioned electronic open-loop and closed-loop control unit 20. A fourth high speed bus 26 forms a direct connection between the electronic open-loop and closed-loop control units 20 and 19 of the electromechanically actuators 12 and 11. The dashed line 28 represents an optionally present line to possible further open-loop and closed-loop control units. The reference symbol 29 denotes all the power supply connections of the elements shown in FIG. 1. From the illustration in FIG. 1 it is apparent that the high speed buses 23 and 24 form a first indirect connection of the HECU 5 to the electronic open-loop and closed-loop control unit 19 of the electromechanical actuator 11, while a second, indirect connection between the abovementioned elements is formed by the high speed buses 25 and 26.

Figure 2:
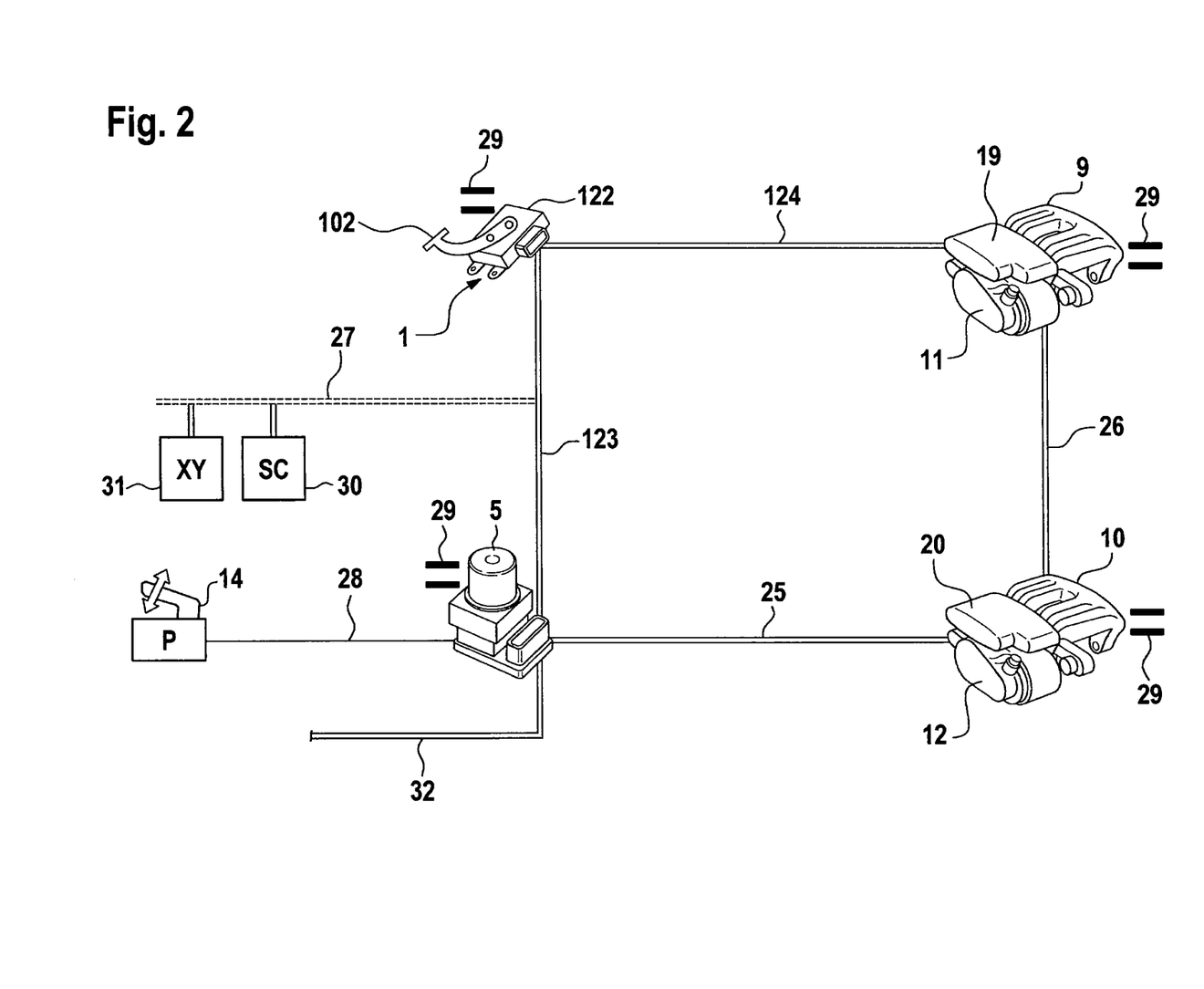
FIG. 2 shows a second embodiment of the braking system according to aspects of the invention in an illustration which is simplified compared to FIG. 1.

In the second embodiment of the combined braking system according to aspects of the invention which is shown in FIG. 2, the activation unit 1 is formed by a brake pedal 102 with a pedal travel sensor 122 which is assigned to it. A first high speed bus 123 connects the activation unit 1 to the HECU 5, while a second high speed bus 124 connects the activation unit 1 to the electronic open-loop and closed-loop control unit 19 of the electromechanical actuator 11. For example a sensor cluster 30 and a further, freely selectable electronic open-loop and closed-loop control unit 31 are connected to the line 27 mentioned in conjunction with FIG. 1. A further communication interface, for example a vehicle bus 32, is connected to the HECU 5. Otherwise, the circuit illustrated in FIG. 2 corresponds to the circuit according to FIG. 1, with components which correspond to one another being provided with the same reference symbols.

Figure 3:
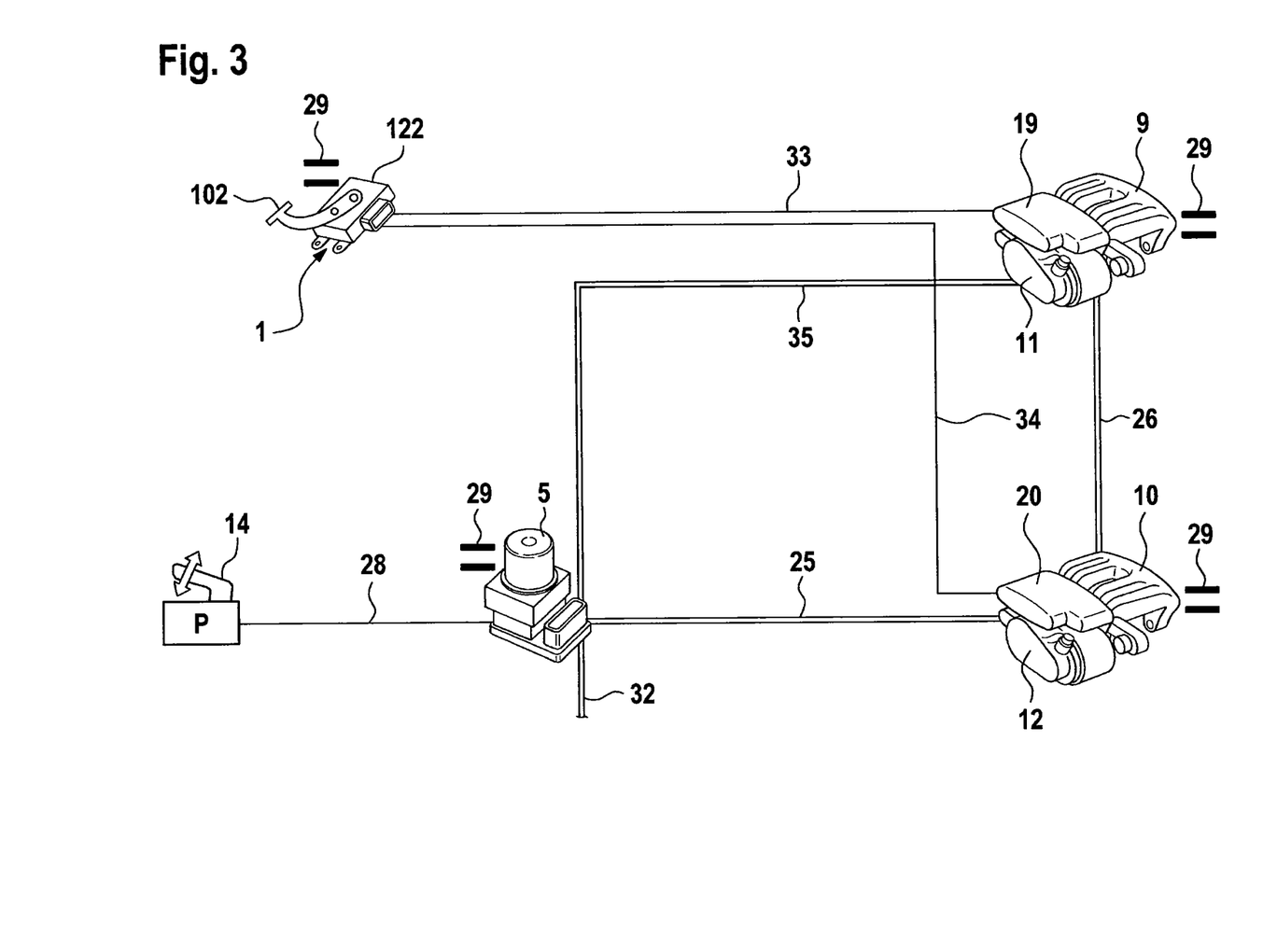
FIG. 3 shows a circuit diagram of a third embodiment of the braking system according to aspects of the invention having brakes which can be activated hydraulically and electromechanically.

The embodiment of the activation unit 1 in the third embodiment variant illustrated in FIG. 3 corresponds to that of the activation unit 1 according to FIG. 2. Signal lines 33, 34 are used for the transmission of signals between the pedal travel sensor 122 and the electronic open-loop and closed-loop controls 19 and 20 of the electromechanical actuators 11, 12, with the HECU 5 being directly connected to the electronic open-loop and closed-loop control unit 19 by means of a further high speed bus 35. From the circuit diagrams shown both in FIG. 2 and FIG. 3 it is apparent that both illustrated variants can operate only in the "brake-by-wire" operating mode.

Figure 4:
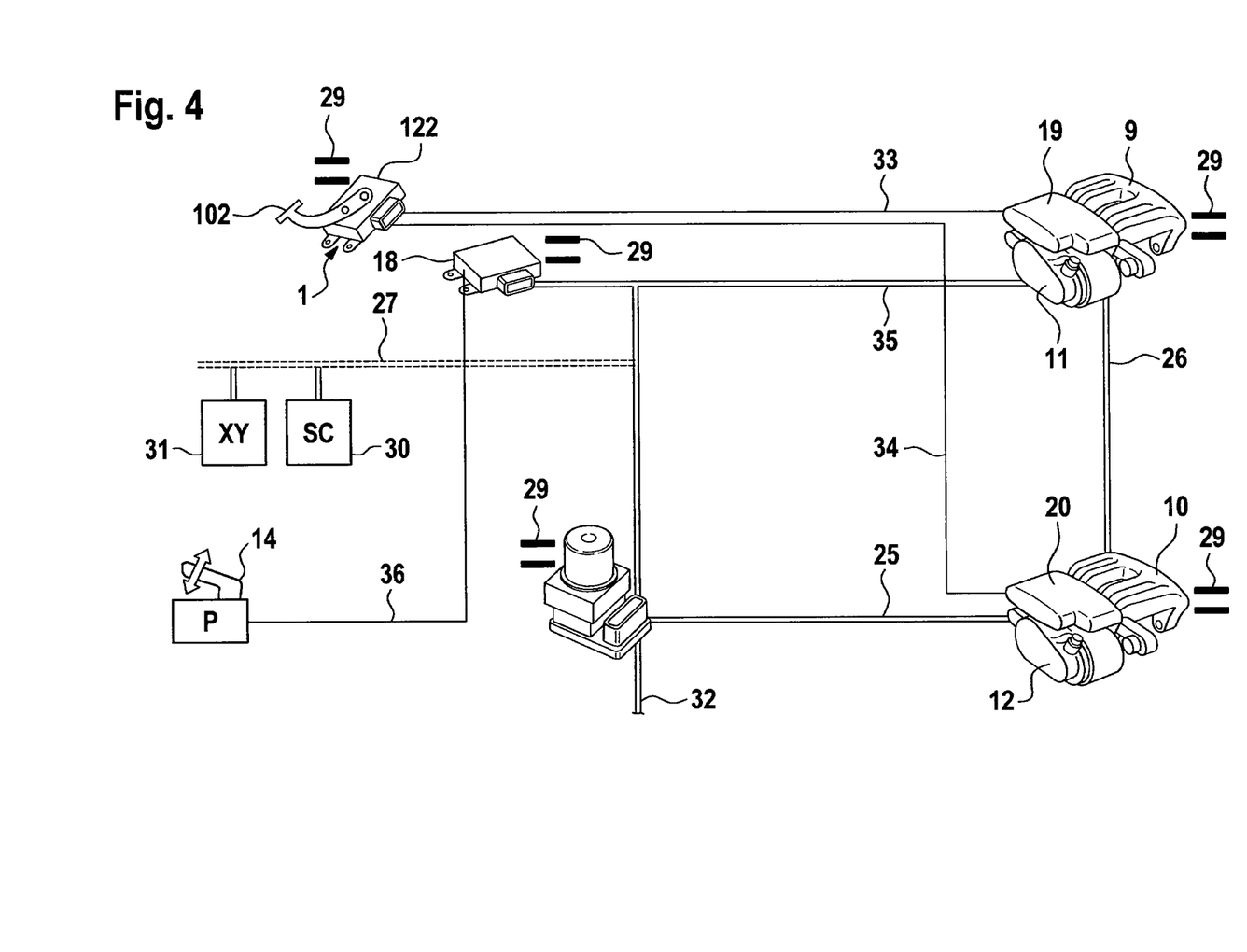
FIG. 4 shows a circuit diagram of a fourth embodiment of the braking system according to aspects of the invention in an illustration corresponding to FIG. 3.

The design of the fourth embodiment of the subject matter of the invention shown in FIG. 4 corresponds largely to that of the embodiment according to FIG. 3. The difference is that both the electronic open-loop and closed-loop control unit 18 which is explained in conjunction with FIG. 1 and the optionally present line 27 to the components 30, 31 shown in FIG. 2 are connected to high speed bus 35 which directly connects the HECU 5 to the electronic open-loop and closed-loop control unit 19. The output signals of the parking brake operator control element 14 are fed via a signal line 36 to the electronic open-loop and closed-loop control unit 18 and from there are switched via the high speed buses 35 and 26 to the electronic open-loop and closed-loop control units 19 and 20 of the electromechanical actuators 11, 12.

Figure 5:
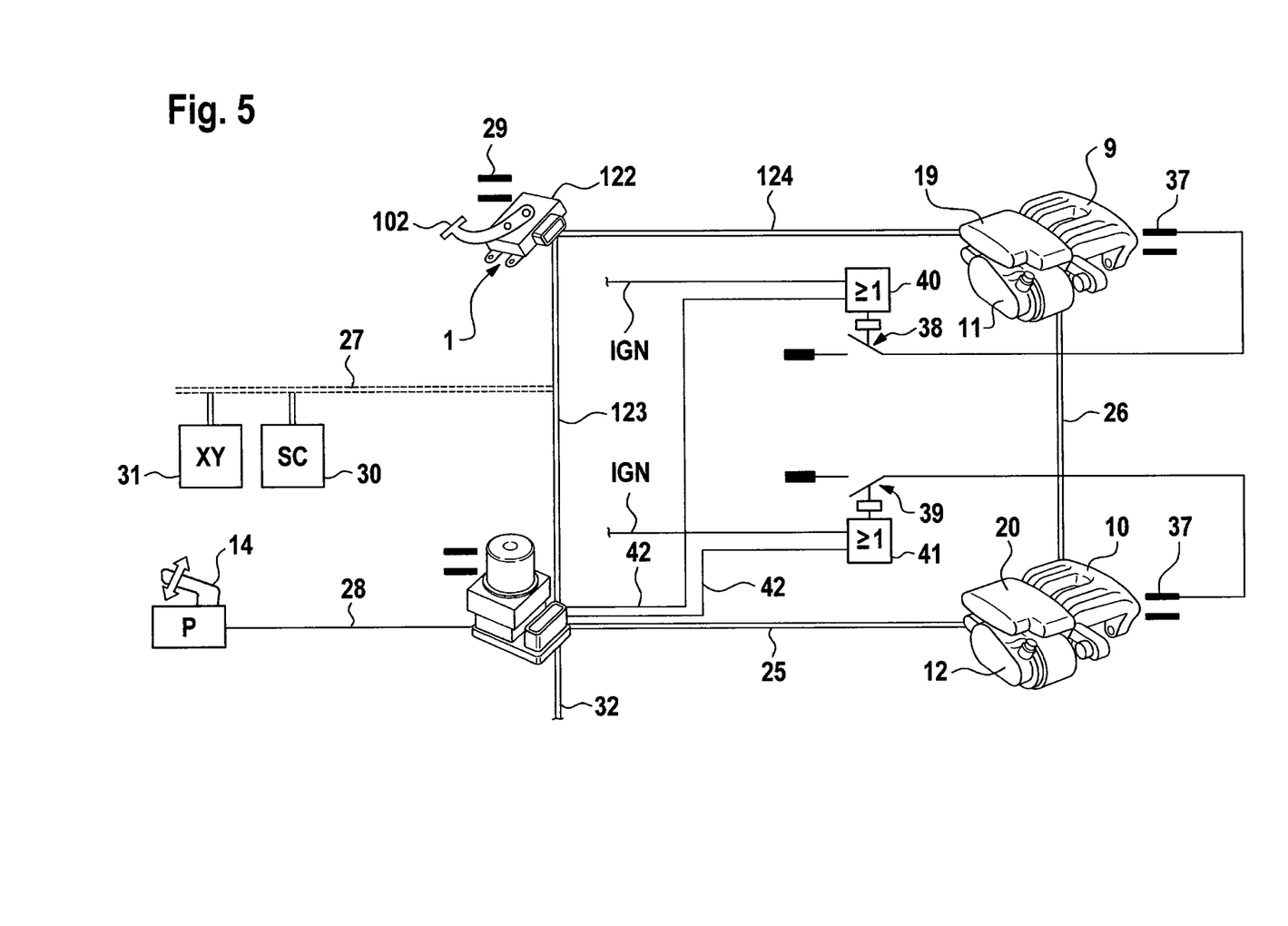
FIG. 5 shows a circuit diagram of a fifth embodiment of the braking system according to aspects of the invention in an illustration corresponding to FIG. 4.

The design of the fifth embodiment of the subject matter of the invention shown in FIG. 5 corresponds largely to that of the embodiment according to FIG. 2. The difference is that the voltage supply of the electromechanical actuators 11, 12 is switched by means of, in each case, one switching relay 38, 39. The switching relays 38, 39 are actuated by output signals of two logic OR circuits 40, 41, the inputs of which are supplied with signals 42 which are generated by the HECU 5, and signals IGN which are generated, for example, by the vehicle ignition system.

Figure 6:
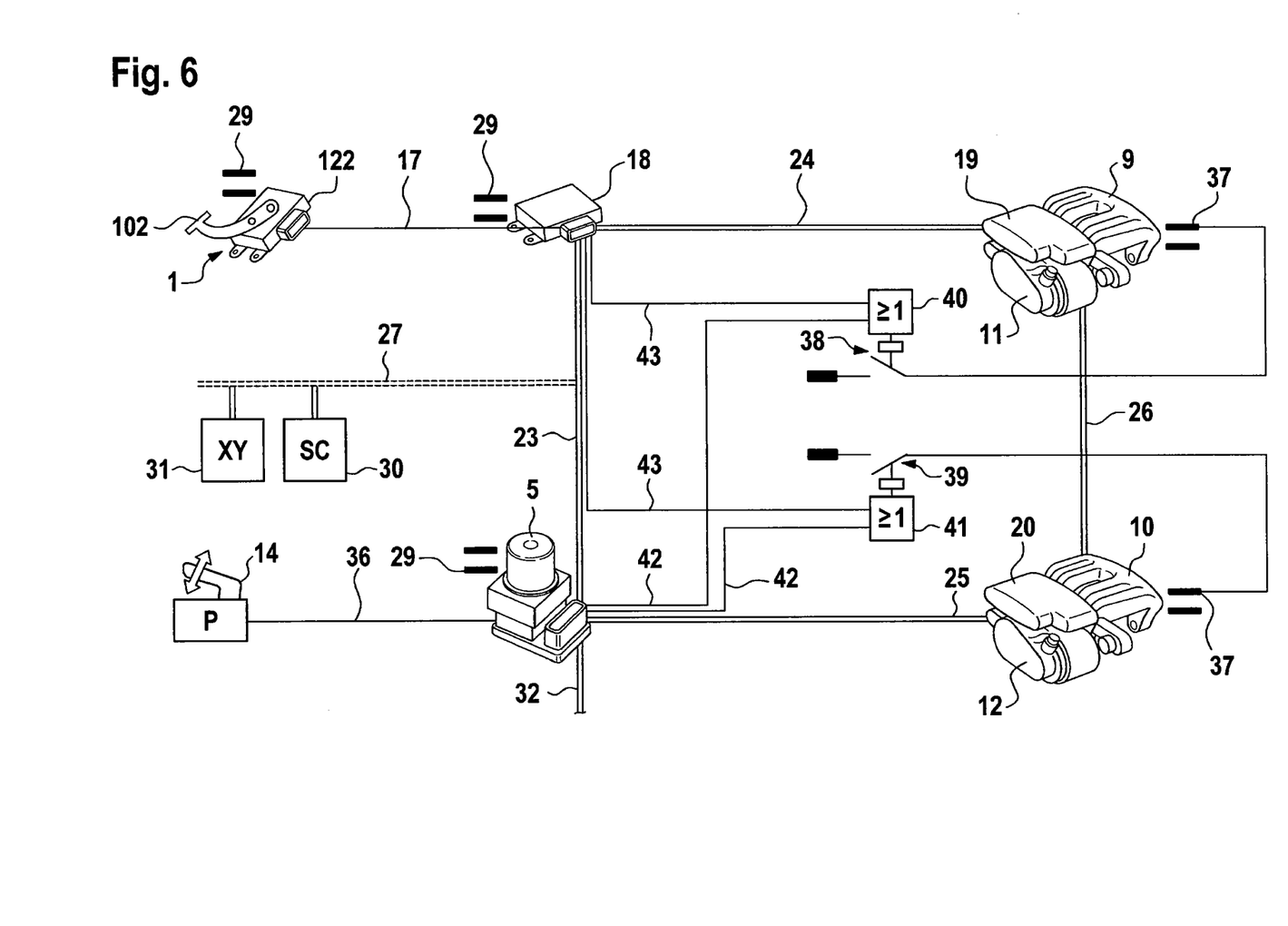
FIG. 6 shows a circuit diagram of a sixth embodiment of the braking system according to aspects of the invention in an illustration corresponding to FIG. 5.

In the sixth embodiment variant of the subject matter of the invention shown in FIG. 6, a further electronic open-loop and closed-loop control unit 18 is switched in the signal path (23, 24) between the HECU 5 and the electronic open-loop and closed-loop control unit 19 which is assigned to the electromechanical actuator 11, which further electronic open-loop and closed-loop control unit 18 was mentioned, for example, in conjunction with FIG. 1 and to which the braking request signals generated by the brake pedal sensor 122 are fed via the signal line 17. In the switched voltage supply of the electromechanical actuators 11, 12 which correspond to FIG. 5, control signals 43, which are generated by the further electronic open-loop and closed-loop control unit 18, are fed, instead of the ignition signals IGN, to the inputs of the OR circuits 40, 41 which are assigned to the two switching relays 38, 39.

The invention claimed is:
1. A combined braking system for vehicles comprising:
wheel brakes on a first vehicle axle which are hydraulically activatable;
wheel brakes on a second vehicle axle which are electromechanically activatable by electromechanical actuators each having a respective actuation control unit;

an electrohydraulic open-loop and closed loop control unit for controlling the brakes on the first axle;

wherein the wheel brakes assigned to the second vehicle axle are activated in accordance with a braking request which is predefined at the wheel brakes assigned to the first vehicle axle, or data derived therefrom via a vehicle bus, or in accordance with output signals of a pedal travel sensor or driver braking request-sensing sensor which is of redundant design and which determines an activation travel of a brake pedal or brake operator control element;

wherein the wheel brakes on the second axle comprise a parking brake device which is actuatable by a parking brake operator control element;

a first communication bus directly connecting the respective actuation control units of the electromechanical actuators, but not directly connecting either of the respective actuation control units of the electromechanical actuators to the electrohydraulic open-loop and closed loop control unit;

a second communication bus directly connecting the electrohydraulic open-loop and closed loop control unit to one of the respective actuation control units of the electromechanical actuators, but not directly connecting the electrohydraulic open-loop and closed loop control unit to any other respective actuation control units of the electromechanical actuators; and a third communication bus coupling the electrohydraulic open-loop and closed loop control unit to another one of the respective actuation control units of the electromechanical actuators.

2. The combined braking system as claimed in claim 1, wherein the pedal travel sensor is connected indirectly or directly, on two separate paths, to the actuation control units which are assigned to the electromechanical actuators.

3. The combined braking system as claimed in claim 2, wherein the paths which are separate from one another are formed by buses or signal lines.

4. The combined braking system as claimed in claim 1, wherein at least one of the communication buses is embodied as a point-to-point connection.

5. The combined braking system as claimed in claim 1, wherein the operator control element for activating the parking brake is connected directly to an electronic open-loop and closed-loop control unit.

6. The combined braking system as claimed in claim 5, wherein the electronic open-loop and closed-loop control unit is included in the electrohydraulic open-loop and closed-loop control unit.

7. The combined braking system as claimed in claim 5, wherein the electronic open-loop and closed-loop control unit is external to and coupled to the electrohydraulic open-loop and closed-loop control unit.

8. The combined braking system as claimed in claim 5, wherein, in the event of a fault of one of the communication buses, system-relevant data is fed automatically via another one of the buses indirectly or directly to the electronic open-loop and closed-loop control unit connected thereto.

9. The combined braking system as claimed in claim 1, wherein, in an event of a failure of one of the actuation control units which is assigned to either an electromechanical actuator or an electrical terminal of the electromechanical actuator, the system remains fully available and can be used for a parking brake function and service brake function.

10. The combined braking system as claimed in claim 1, wherein an electrical supply to one or more electromechanical actuators is provided individually or jointly by an actuation of one or more electrical switches controlled by a logic 'OR' operation performed on:
   a) a signal supplied by the electrohydraulic open-loop and closed-loop control unit and on an ignition signal (IGN), or
   b) the signal supplied by the electrohydraulic open-loop and closed-loop control unit and a signal supplied by a further electronic open-loop and closed-loop control unit.

11. The combined braking system as claimed in claim 1, wherein the communication buses are used continuously for data transfer in a normal operating mode and are monitored.

12. The combined braking system as claimed in claim 1, wherein, in an event of a failure of the electrohydraulic open-loop and closed-loop control unit at which detection of the braking request by the electrohydraulic open-loop and closed-loop control unit or its transmission to the actuation control units are no longer reliably possible, the pedal travel sensor information is used to activate the electromechanical actuators.

13. The combined braking system as claimed in claim 12, wherein the actuation control units which are assigned to the electromechanical actuators communicate the braking request to one another.

14. The combined braking system as claimed in claim 12, wherein the actuation control units which are assigned to the electromechanical actuators are each configured to be failsafe and, as a result, carry out the braking request or a parking braking request if there is a reliable individual command or a redundant command.

15. The combined braking system as claimed in claim 1, wherein, a plurality of commands are transmitted redundantly on at least two of the communication buses to an electronic open-loop and closed-loop control unit or the actuation control units of the electromechanical actuators.

16. The combined braking system as claimed in claim 15, wherein, if the command data of one data path fails, at least one of the actuation units uses the data of another data path.

17. The combined braking system as claimed in claim 1 further comprising monitoring mechanisms on the communication buses to make the data transmission more reliable.

18. The combined braking system as claimed in claim 1, wherein data which reach an actuation unit of an electromechanical actuator, but are not intended for the actuator, are passed on to a receiver on another one of the communication buses of the electromechanical actuator.

19. The combined braking system as claimed in claim 1, including:
   an electronic open-loop and closed loop control unit coupled to the second communication bus between the electrohydraulic open-loop and closed loop control unit and the one of the respective actuation control units of the electromechanical actuators,
   wherein the electronic open-loop and closed loop control unit controls the respective electromechanical actuators.

20. The combined braking system as claimed in claim 1, wherein the respective actuation control units of the electromechanical actuators are indirectly connected to each other through the second communication bus and the third communication bus.

* * * * *